United States Patent [19]

Kip et al.

[11] Patent Number: 5,019,813
[45] Date of Patent: May 28, 1991

[54] SYSTEM FOR THE CONTACTLESS EXCHANGE OF DATA

[75] Inventors: Harm J. Kip, Lichtenvoorde; Willem H. J. Venema, Enschede, both of Netherlands

[73] Assignee: N.V. Nederlandsche Apparatenfabriek Nedap, De groenlo, Netherlands

[21] Appl. No.: 180,745

[22] Filed: Apr. 12, 1988

[30] Foreign Application Priority Data

Apr. 13, 1987 [NL] Netherlands ............... 8700861

[51] Int. Cl.$^5$ ............................................. H04B 5/00
[52] U.S. Cl. ................................. 340/825.54; 342/51; 340/573
[58] Field of Search ............. 340/825.54, 825.34, 340/572, 825.3, 825.31, 573; 342/50, 51; 235/375, 449, 450

[56] References Cited

U.S. PATENT DOCUMENTS

| | | | |
|---|---|---|---|
| 4,333,072 | 6/1982 | Beigel | 340/825.54 |
| 4,517,563 | 5/1985 | Diamant | 340/825.30 |
| 4,602,253 | 6/1986 | Kaeft | 340/825.31 |
| 4,656,472 | 4/1987 | Walton | 340/825.54 |
| 4,724,427 | 2/1988 | Carroll | 340/825.54 |
| 4,742,470 | 5/1988 | Juengel | 340/825.54 |
| 4,752,776 | 6/1988 | Katzenstein | 340/825.54 |
| 4,779,839 | 10/1988 | Sears | 340/825.54 |
| 4,864,292 | 9/1989 | Niewkoop | 340/825.54 |

FOREIGN PATENT DOCUMENTS

| | | |
|---|---|---|
| 121308 | 8/1983 | Canada . |
| 176404 | 10/1977 | Netherlands . |
| 257688 | 2/1988 | United Kingdom ........... 340/825.54 |

Primary Examiner—Donald J. Yusko
Assistant Examiner—Dervis Magistre
Attorney, Agent, or Firm—Fleit, Jacobson, Cohn, Price, Holman & Stern

[57] ABSTRACT

A system for the contactless exchange of data between a transceiver and a passive data carrier is described. A prior data carrier comprises at least one digital memory and at least one digital control device for the memory. In it, the data carrier has a single-coil receiver circuit connected to a controllable switch device. In operation, the data carrier provides, in response to an electromagnetic a.c. field generated by a transceiver, via at least one rectifier, supply power for active components of the data carrier and clock signals for the control of digital components of the data carrier. According to the present invention, in order to provide for the possibility of bi-directional data exchange between a transceiver and a passsive data carrier, and in general, to provide a universally applicable data exchange system of the contactless kind, the transceiver is equipped with a modulator for amplitude modulating the a.c. field. The control device has two inputs for the supply of clock signals and data signals and includes level detectors cooperating with the inputs and arranged to allow the passage of an input signal voltage exceeding a pre-determined value as a valid input signal pulse. The coil is connected to the inputs through a two-branch voltage divider so that the voltage at the clock signal input is higher than that at the data signal input.

17 Claims, 2 Drawing Sheets

SYSTEM FOR THE CONTACTLESS EXCHANGE OF DATA

This invention relates to a system for the contactless exchange of data between a transceiver and a passive data carrier, said data carrier comprising at least one digital memory means and at least one digital control device for said memory means, and wherein the data carrier has a single-coil receiver circuit connected to a controllable switch means and, in operation, in response to an electromagnetic a.c. field generated by a transceiver, providing via at least one rectifier means supply power for active components of the data carrier as well as clock signals for the control of digital components of the data carrier.

A system of this kind is known from NL-C-No. 176404. That patent describes a data carrier of the passive type, i.e., of the type which does not have a supply battery of its own. The prior data carrier further comprises a single-coil receiver circuit connected to a switch means. The prior data carrier also comprises a digital memory means in which a code signal is stored, and digital control means for the memory means and the switch means. In operation, the receiver circuit provides, via rectifier means, supply voltage for the active components of the data carrier, and clock signals for the digital components. The receiver circuit of the prior data carrier also serves to generate a code signal detectable by the transceiver. This last is effected when the switch means is controlled in the rhythm of the code signals stored in the memory means.

The prior data carrier is, therefore, a passive data carrier which in response to a suitable interrogation field generates a specific code signal. The data carrier can be recognized by the code signal, so that the prior data carrier is suitable to be used for identification purposes.

In certain cases, however, there is a need for a possibility of sending data to the data carrier from the transceiver, for example, to replace data already stored in the data carrier. The data to be transmitted from the transceiver may comprise address data, e.g., if only a portion of the memory of the data carrier needs to be activated. This is of importance, for example, if the data carrier is provided with one or more sensors coupled to the memory means and capable of storing data therein, which have to be read periodically.

Canadian patent No. 1213018 describes a data carrier suitable for receiving and storing data to be substituted for data stored in the memory of the data carrier. For this purpose this prior data carrier is provided with a second coil. In order to maintain the passive character of the data carrier, a non-volatile memory means of the EEPROM type should be used.

One disadvantage of the use of coils and, a fortiori, of more than one coil, is that these coils are relatively large and bar an effective miniaturization of the data carrier. Nevertheless, for a number of applications it is of importance that the data stored in a data carrier can be changed by wireless means in a simple manner, while in addition it is desirable for the data carrier to be as small as possible.

One example is the application of data carriers for the identification of tool holders of automatic machines such as, for example, numerical lathes and the like. The force pattern occurring in such a tool holder does not permit the formation of a substantial recess for accommodating a data carrier.

It is an object of the present invention to satisfy the above means for miniaturizable data carriers designed for bi-directional data exchange with a transceiver, and, in general, to provide a universally applicable data exchange system operating in a contactless manner.

For this purpose, according to the invention, a system for the contactless exchange of data of the above kind is characterized in that the transceiver comprises a modulator for the amplitude modulation of said a.c. field and that the control device has two inputs ("HF clock" and "HF data") for the supply of clock signals and data signals and includes level detectors cooperating with said inputs and arranged to allow the passage of an input signal voltage exceeding a pre-determined value as a valid input signal pulse, the coil being connected to said inputs through a two-branch voltage divider so that the voltage at the clock signal input is higher than that at the data signal input.

The invention will now be described in more detail with reference to the accompanying drawings. In said drawings, FIG. 1 diagrammatically shows a system for the contactless exchange of data;

FIG. 2 diagrammatically shows an example of a data carrier for a system according to the invention;

Figure 1:
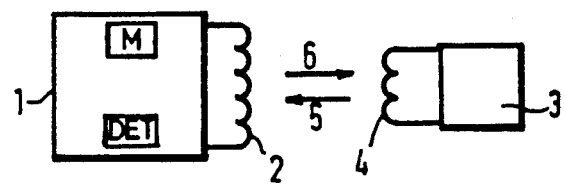

FIG. 1 diagrammatically shows a system for contactless data exchange. The system shown comprises a transceiver 1 with an antenna 2 which, in operation, generates an electromagnetic a.c. field in a zone not indicated. Transceiver 1 includes a transmission power level adjustment know for controlling, for instance, a Potentiometer P. It should be noted that the transceiver comprises a transmitting section and a receiving section. These sections are generally combined into one single apparatus, but this is not strictly necessary. As used herein, the term transceiver designates both of these possible situations.

The system further comprises a passive data carrier 3, sometimes called a responder. Data carrier 3 has a single antenna coil 4 serving for power transmission, which is known per se, and for data transmission from the data carrier to the transceiver, which is also known per se, and is symbolized in FIG. 1 with an arrow 5.

In the system according to this invention, as will be described for fully hereinafter, data transmission from the transceiver to the data carrier is also possible, via the same coil, as symbolized by an arrow 6.

The transceiver further comprises a modulator M and a detector DET, the functions of which will be described in more detail hereinafter.

Figure 2:
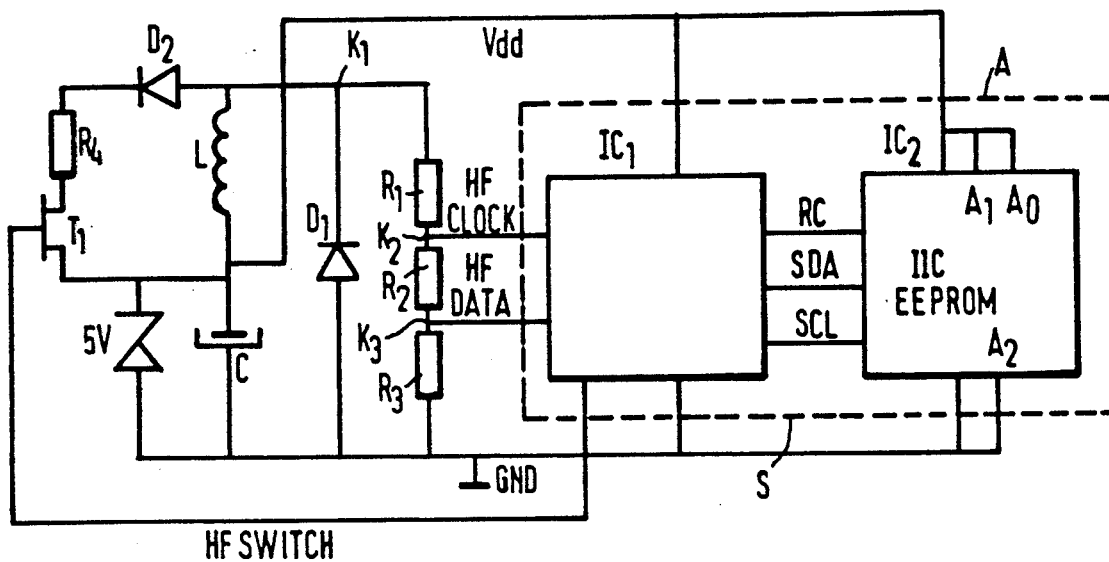

FIG. 2 diagrammatically shows one embodiment of a data carrier for a system according to the invention. The data carrier shown comprises a coil L corresponding to the coil 4 of FIG. 1. The coil can be tuned by means of a capacitor to the frequency of the a.c. field which in operation is generated by the transceiver, but preferably a broadband coil is used to enable the communication factually taking place via the coil between the transceiver and the data carrier to be performed as fast as possible. With the embodiment shown, it is even possible to transmit one bit of information in each period of the a.c. field.

Such a manner of modulating the a.c. field (=the carrier wave) per period cannot be used with a receiver circuit that is a tuned circuit, because in that case swinging would occur, which could render amplitude detection impossible. A practical carrier wave frequency is 120 kHz, which accordingly makes possible a bit rate of 120,000 bits/sec.

When the data carrier is in the a.c. field generated by a transceiver, a voltage is generated across coil L, which, via a rectifier diode D1, a levelling capacitor C and a 5 V Zener diode, serving for stabilization, supplies a d.c. supply voltage for the active part A of the data carrier. In the example shown, the active part comprises two integrated circuits or chips IC1 and IC2.

The voltage at the node k1 of coil L and diode D1 can vary between zero and approximately twice VDD, with VDD being the supply voltage needed for the integrated circuits. The node k1 is connected via a voltage divider, built up from three series-connected resistors R1, R2, R3, to ground GND. The node k2 between R1 and R2 is connected to a clock input "HF clock" of IC 1, with R1 being between k1 and k2. The node k3 between R2 and R3 is connected to a data input "HF data" of IC1.

The values of R1, R2 and R3 have been so selected that when a strong signal is received, i.e., when there is a relatively high voltage across the single coil L, the voltage at node k3 is higher than ½ VDD. The integrated circuit IC1 is arranged so that a signal higher ½ VDD is accepted and processed as a valid input signal, but a signal lower than ½ VDD is not. When a voltage higher than ½ VDD prevails at node k3, the voltage at node k2 is still higher, so that in that case a valid input signal also prevails at the input "HF clock".

At a lower voltage across coil L, the voltage at node k2 may be higher than ½ VDD, while the voltage at node k3 is lower than VDD.

Accordingly, by means of a suitable amplitude modulation of the voltage generated across coil L, and hence by means of a suitable amplitude modulation of the a.c. field generated by a modulator M (FIG. 1) of the transceiver, it can be accomplished that, in operation, a clock signal is offered to the input "HF clock" and at the same time a data signal to the input "HF data", which latter signal is processed further by IC1 as "0" or as "1", depending on the voltage generated at node k3.

In the manner described, therefore, clock signals and data signals can be simultaneously supplied to an active circuit of a data carrier via a single receiver coil. Because, as will be explained in more detail hereinafter, the single coil L is also used for generating binary signals detectable by a detector DET (FIG. 1) of the transceiver, a data carrier according to the invention is hence optimally suited for miniaturization.

Figure 3A:
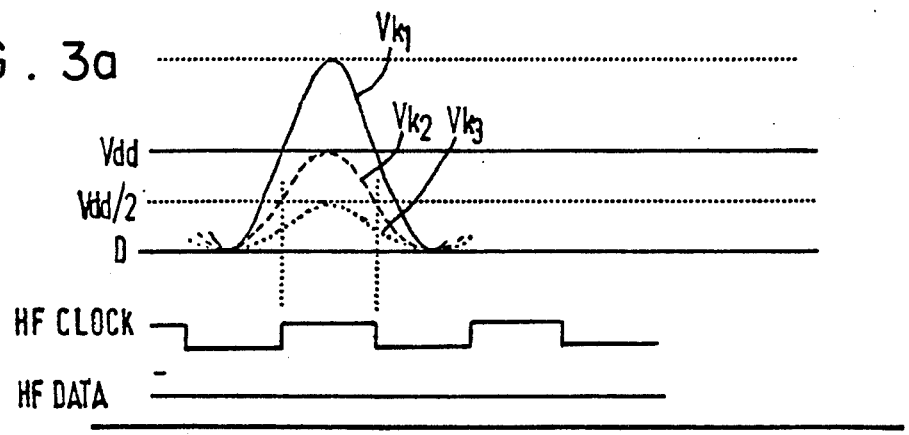
FIGS. 3a and 3b show some voltage forms which may occur in the data carrier of FIG. 2.

For the sake of completeness, a wave form of the voltage Vk1 which in operation occurs at node k1 is shown in FIG. 3a, which voltage has such a value that the voltage prevailing at node k2 has a peak value between VDD and ½ VDD, while the voltage prevailing at node k3 remains lower than ½ VDD. As also shown in FIG. 3a, the input "HF clock" accordingly accepts a valid input pulse, while the input "HF data" does not react to the too low input signal, or regards this signal as a binary "0" (or as a "1", depending on the logic used).

Figure 3B:
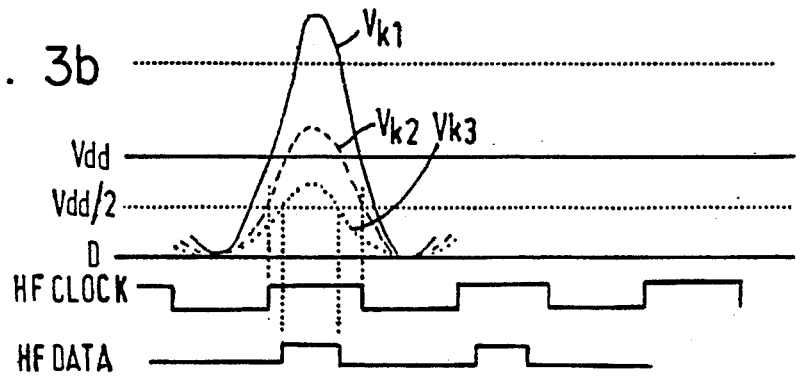

In the situation shown FIG. 3b, the voltage Vk1 is so high that both "HF clock" and "HF data" accept the voltage prevailing at nodes k2 and k3 as a pulsed input signal.

The active part A of the circuit of the data carrier can in principle be composed in various ways. The active part A should at any rate be arranged to be controlled through inputs "HF clock" and "HF data" in such a manner that data can be stored, can be erased and/or replaced and can be read. Accordingly, a passive data carrier which is not continuously in a field generated by a transceiver, and is not desired to be re-programmed prior to each period of use either, requires an EEPROM type memory means (EEPROM means Electrically Erasable Programmable Read Only Memory). In principle, a custom chip incorporating such an EEPROM could be used. Such a custom chip could comprise all requisite terminals, buffer means and the like required for the communication between the EEPROM and the remainder of the data carrier. These terminals may include terminals for one or more sensors S (FIG. 2) capable of transmitting data to the data carrier.

The example shown employs an existing EEPROM type, i.e., the EEPROM OCB 8582, marketed by Philips. This EEPROM is designed for use in a so-called IIC architecture and operates by the IIC protocol. (IIC is Inter-Integrated Circuit). Integrated circuits designed for use in an IIC architecture have a bi-directional serial data bus and a clock line, and data can be written or read in the EEPROM by a pre-determined protocol, the so-called IIC protocol.

The IIC architecture and the IIC protocol are known per se, for example, from the article "Circuits for modular design of consumer and industrial products—the CLIPS system" by E. T. Keve, Electronic Components and Applications, Vol. 5, No. 2, February, 1983, and from the article: "An integrated serial bus architecture: principles and applications", by Mitchell e.a. in IEEE Transactions on Consumer Electronics, Vol. CE-31, No. 4, November, 1985.

One advantage of the use of such an IIC architecture is that all signals are processed in series. Consequently, the integrated circuits require relatively few pins and can be mounted in a small housing, which itself also occupies little space. Accordingly, the use of an IIC architecture considerably promotes the possibilities of miniaturization of the data carrier.

In the example shown, the EEPROM IC2 is connected through a serial data line SDA and a serial clock line SCL to a gate array IC1, which is also suitable for use in an IIC architecture and forms an interface between the EEPROM and the remainder of the circuit of the data carrier.

It is noted that, in principle, it is possible for the EEPROM to be directly controlled with the signals appearing at the nodes k2, k3, or signals corresponding with these. In order to reduce the risks of errors as much as possible, however, the gate array IC1 is used as an interface in the example shown.

The circuit IC1 may consist of a microprocessor or of a complete hardware gate array or of a combination of these two. At any rate, at the input end, means are required which can ignore an input signal having an amplitude lower than a pre-determined value, e.g. ½ VDD, and can form an input pulse signal from an input signal with a higher value. Such means may, for example, comprise a Schmitt trigger or, generally, a comparator. The circuit IC1 may further comprise flip-flops, shift registers, buffer means and an internal clock signal generator.

The data transmission is effected as follows. The signals "HF clock" and "HF data", obtained by suitable modulation as described above, continually determine the status of the IIC clock line SCL and of the IIC data line SDA.

Figure 4:
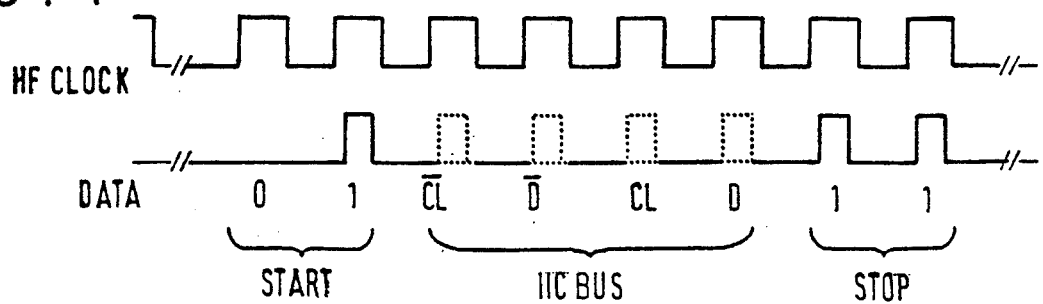
FIG. 4 shows an example of some clock and data signals.

FIG. 4 shows that eight successive clock pulses "HF clock" are used to determine the status of the lines SDA and SCL. First a starting code is needed, which in this example consists of two "HF data" pulses successively having the values "0" and "1". Subsequently the desired status of the lines SDA and SCL is transmitted by means of the "HF data" signals. These signals are designated by D and CL, respectively, in FIG. 4. For the sake of safety, the inverted signals $\overline{D}$ and $\overline{CL}$ are also transmitted, whereafter a stop code follows, which in this example consists of two "HF data" pulses having the value "1".

The packet of 8 bits (1 byte) thus transmitted accordingly comprises in fact only one data bit. The actual bit rate in this method is therefore low. This effect can be compensated by separately modulating each period of the carrier wave (the a.c. field) at the transmission side, so that each period provides an "HF clock" and an "HF data" signal as mentioned hereinbefore.

When these eight bits have been transmitted faultlessly, the transmitter carrier wave is not modulated in the next eight periods of the 120 kHz carrier wave. During these eight periods, the gate array short-circuits the receiver coil four times at half the frequency of the carrier wave signal, i.e., at a frequency of 60 kHz. The phase (0° or 180°) of this 60 kHz corresponds to the status of the IIC data line (SDA) and serves as a control of the communication between the data carrier and the transceiver (echo) and as a possibility of reading the data carrier.

Figure 5A:
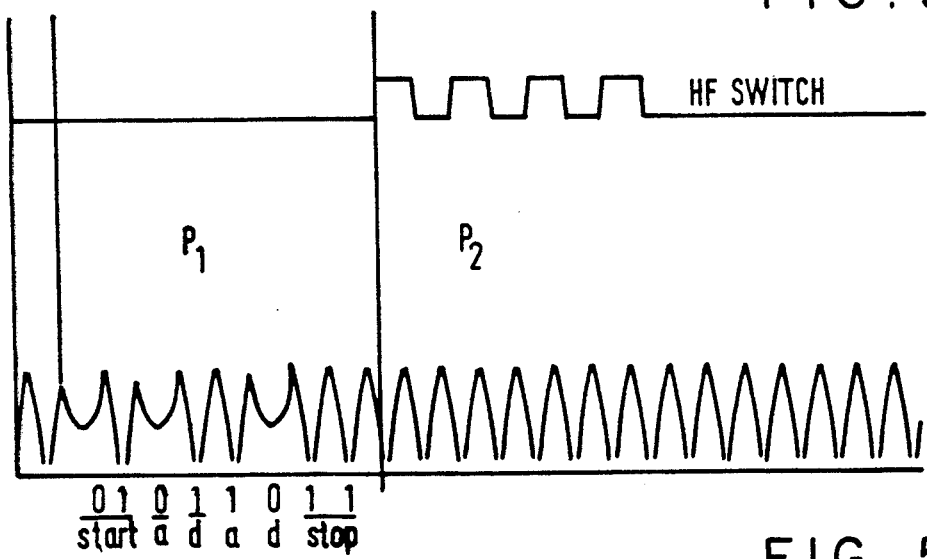
FIGS. 5a and 5b show some additional signal forms which may occur in a system according to the invention.
Figure 5B:
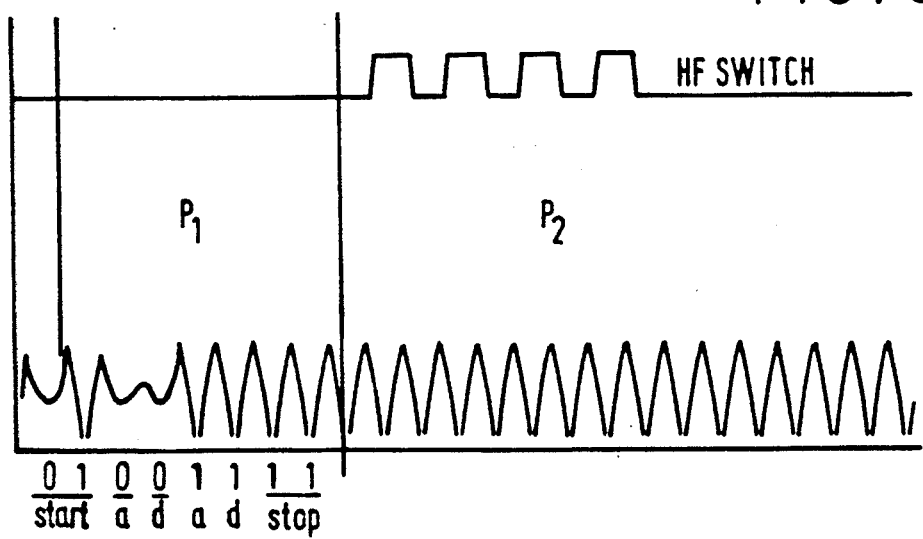

For the sake of clarity, the modulated carrier wave signal is shown in FIG. 5 during the first eight periods P1 and during the next periods P2, with the reply signal from the data carrier above it in case the status of the data line SDA is "low" ("0") (FIG. 5a) or "high" ("1") (FIG. 5b). The difference between these two situations is shown by the phase of the signal formed by the gate array "HF switch" as shown in FIG. 5. The signal formed by the gate array is supplied to a transistor T1 serving as a switch means, which is thus brought alternately into the conducting and the blocking condition. When T1 is in the conducting state, a resistor R4 constitutes an additional load of the coil L so that the voltage generated by the a.c. field across coil L decreases periodically, which can be detected in known manner by the transceiver.

It is noted that T1 and R4 are connected via a diode D2 to the coil L. As a result, only the positive (or only the negative) peaks of the voltage across coil L are influenced. This latter is not shown in FIG. 5. In this way, therefore, the voltage across coil L and hence the provision of supply voltage are affected as little as possible. The two possible phases of the signal "HF switch" formed by the gate array relative to the carrier wave signal can be detected at the transmission side with the detector DET by determining a progressive average of the amplitude of the even and the odd peaks and comparing these averages with each other. Alternatively, first the signal "HF switch" formed by the gate array could be reconstructed at the transmission side, and subsequently compared with the phase of the transmission carrier wave signal.

In the manner described hereinbefore, IIC clock pulses and IIC data signal pulses can be successively supplied to the lines SDA and SCL under the control of the signals "HF clock" and "HF data". The data signal pulses should provide address data and, in combination with the IIC clock signals, starting and stopping commands, "acknowledge" reports, reading or writing commands, and naturally the data to be written into the memory means. The data to be read is determined by the contents of the memory means itself and rendered detectable to the transceiver in the manner described hereinbefore with regard to the "echo" via control of the switch means by the "HF switch" signal. All this is effected by the known per se IIC protocol.

As the data carrier operates only if the voltage across the coil has such a value that "HF clock" and "HF data" continuously pass the level ½ VDD, there is provided a searching routine in the transceiver for setting the proper transmission level. As a result of the variation in distance, and hence in magnetic coupling between data carrier and transceiver, too, the voltage induced in L is not constant. The searching routine provides for operation, from "0", with ever higher strength of the transmission signals.

When a data carrier is within the reach of the transmitter, at a given moment the voltage in coil L will be such that the data carrier begins to operate. Further increase of the transmission level means that, at a given moment, the "HF data" signal in both modulation states comes above ½ VDD, so that these modulations are no longer "seen" by the gate array. These two critical transmission levels are memorized b the transceiver and for reading and writing into the data carrier, the transmission level is set half-way between these two levels. In the transceiver this new level can be memorized and used as a starting point for a next searching procedure.

It is noted that, in view of the foregoing, various modifications of the circuits shown and/or the described use thereof will readily occur to those skilled in the art. Thus the data exchange system can also be used when the data carriers have their own supply voltage source in the form of a battery. Also, in principle, instead of the IIC architecture described, a different configuration of the active part A can be selected. Furthermore, more than one coil could be used. Such modifications are considered to fall within the scope of the present invention.

It is finally noted that, in FIG. 2, a connection between IC1 and IC2, designated by RC, is shown. This connection serves for special internal clock signals, needed with the type of EEPROM used, but falling outside the IIC system, and unnecessary with other and/or future EEPROM's and therefore not described in any detail herein.

We claim:

1. A system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and, in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two-branch voltage divider so the voltage at the clock signal input is higher than at the data signal input, has two inputs for receiving clock signals and data signals from the receiver circuit and includes level detectors cooperating with said inputs and arranged to allow the passage of an input signal voltage exceeding a pre-determined value as a valid input signal pulse to said memory means.

2. A system as claimed in claim 1, characterized in that the memory means is a non-volatile memory.

3. A system as claimed in claim 1, characterized in that the memory means is an EEPROM designed according to the IIC architecture.

4. A system as claimed in claim 3, characterized in that the memory means is connected to the digital control device via an IIC bus, which comprises a serial data line and a clock line.

5. A system as claimed in claim 1, characterized in that the voltage which, in operation, prevails across the coil is supplied to the voltage divider connected parallel to a first single-acting rectifier means (D1), and that the switch means is connected to the coil in series with a second single-acting rectifier means (D2) acting oppositely to said first single-acting rectifier means (D1).

6. A system as claimed in claim 1, characterized in that the switch means has a control input connected to the digital control device.

7. A system as claimed in claim 1, characterized in that the modulator of the transceiver is arranged, in operation, to vary the modulation per period of the a.c. field.

8. A system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and, in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two-branch voltage divider so the voltage at the clock signal input is higher than at the data signal input has two inputs for receiving clock signals and data signals from the receiver circuit and includes level detectors cooperating with said inputs and arranged to allow the passage of an input signal voltage exceeding a pre-determined value as a valid input signal pulse and further characterized in that the memory means is an EEPROM designed according to the IIC architecture and is connected to the digital control device via an ICC bus, which comprises a serial data line and a clock line and the control device is arranged to form a control signal for the switch means with a frequency which is a submultiple of the frequency of the a.c. field, and whose phase relative to the a.c. field depends on the status of the serial data line.

9. A system as claimed in claim 8, further characterized in that the frequency of the control signal is half the frequency of the a.c. field.

10. A system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and, in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two-branch voltage divider so the voltage at the clock signal input is higher than at the data signal input, has two inputs for receiving clock signals and data signals from the receiver circuit and includes level detectors cooperating with said inputs and arranged to allow the passage of an input signal voltage exceeding a pre-determined value as valid input signal pulse and further characterized in that the memory means is an EEPROM designed according to the IIC architecture and is connected to the digital control device via an ICC bus, which comprises a serial data line and a clock line and the control device is arranged to form a control signal for the switch means with a frequency which is a submultiple of the frequency of the a.c. field, and whose phase relative to the a.c. field depends on the status of the serial data line; and the control device is arranged, each time after the receipt of a pre-determined number of bits via the data input, to feed back the status of the serial data line by corresponding control of the switch means.

11. A system as claimed in claim 8, further characterized in that the detector of the transceiver is arranged to reconstruct the control signal and to compare the phase of the reconstructed signal with that of the a.c. field.

12. A system as claimed in claim 8, further characterized in that the detector of the transceiver is arranged to determine the amplitude of successive peaks of the a.c. field and from it to determine the phase of the control signal.

13. A system as claimed in claim 8, further characterized in that the detector of the transceiver is arranged to determine a progressive average of the amplitude of the odd and the even peaks of the a.c. field and compare these with each other to determine the phase of the control signal.

14. A system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and, in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two branch voltage divider so the voltage at the clock signal input is higher than at the data signal input, has two inputs for receiving clock signals and data signals from the receiver circuit and includes level detectors cooperating with said inputs and arranged to allow the passage of an input signal voltage exceeding a pre-determined value as a valid input signal pulse to said memory means and characterized by at least one sensor connector to the control device.

15. A system as claimed in claim 14, further characterized in that the sensor has built up a serial interface according to the IIC architecture.

16. A data carrier for use in a system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and, in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two branch voltage divider so the voltage at the clock signal input is higher than at the data signal input, has two inputs for receiving clock signals and data signals from the receiver circuit and includes level detectors cooperating with said inputs and arranged to allow the passage of an input signal voltage exceeding a pre-determined value as a valid input signal pulse to said memory means.

17. A system for the contactless exchange of data between a transceiver and a passive data carrier, said data carrier comprising at least one digital memory means and at least one digital control device for controlling said memory means, and wherein the data carrier has a single-coil receiver circuit connected to a controllable switch means and , in operation, in response to an electromagnetic a.c. field generated by a transceiver, provides via at least one rectifier means supply power to active components of the data carrier as well as clock signals for controlling digital components of the data carrier, characterized in that the transceiver comprises a modulator for the amplitude modulation of said a.c. field received by said coil receiver circuit and that the control device, connected to said coil through a two branch voltage divider so the voltage at the clock signal input is higher than at the data signal input, has two inputs for receiving clock signals and data signals from the receiver circuit and includes level detectors cooperating with said inputs and arranged to allow the passage of an input signal voltage exceeding a pre-determined value as a valid input signal pulse to said memory means and further characterized in that the transceiver includes means for varying the transmission power level between zero and a pre-determined maximum value and setting it at a level intermediate the level at which a data carrier just returns signals and a level at which the data carrier no longer perceives any difference between a binary "0" and a binary "1".

* * * * *